Patented Dec. 12, 1933

1,939,440

UNITED STATES PATENT OFFICE 1,939,440

METHOD OF PRODUCING PRESSED RUBBER FOOTWEAR

Henry Christian Louis Dunker, Helsingborg, Sweden

No Drawing. Application June 26, 1930, Serial No. 464,108, and in Norway May 27, 1930

4 Claims. (Cl. 18—56)

This invention relates to a modification and improvement of the method of manufacturing pressed rubber footwear forming the subject matter of my United States Letters Patent No. 1,868,-137, issued July 19, 1932 which relates to a method of mechanically pressing rubber footwear with wholly or partly rubber-covered sides, as for inst. galoshes or sea-side shoes or the like, formed up in a press machine between heated outer molds e. g. four side moulds, a sole mould and a press last covered with the necessary layers of fabric and rubber. The mechanical pressing of rubber footwear referred to in Patent No. 1,868,137 is effected in such manner that a press last having the dimensions and shape of the interior cavity of the rubber footwear to be manufactured is first covered with a pre-vulcanized lining shoe or the like and thereafter coated with a small number of non-preformed rubber pieces transformed and caused to flow together by the active outer molds of the press when these move toward the passive last during the pressing process, so that the outer rubber of the footwear assumes the desired shape during a cast-like pressing process effected by the inwardly moved outer molds. According to the said patent the rubber foot-wear is made in such a way that before the insertion of the press last in the press the last is first covered with a pre-vulcanized shoe or boot-like lining-innershoe made from rubber-covered lining fabric, whereafter the said inner shoe is covered with roughly cut pieces of unvulcanized rubber to be formed up during the pressing process to the outer shape of the ready rubber footwear. The made-up pre-vulcanized lining shoe according to the said patent may consist solely of rubber-covered lining fabric, or the lining shoe may be reinforced by suitable rubber layers at different portions e. g. around the heel. The reason why pressing up of rubber foot-wear has been combined with the employment of a made-up shoe or boot-like pre-vulcanized lining portion is that in the pressing up such high pressures are used on the outer rubber covering of the last that the outer rubber tends to penetrate through the lining if this is not pre-vulcanized. The made pre-vulcanized, shoe-like lining portion has also been employed to prevent the lining from folding owing to the rather high displacing pressures occurring during the pressing up of the outer rubber layers. The invention has for its object to attain the same advantages as are attained by the use of the shoe or boot-like lining portion while at the same time saving the work connected with the production of the lining portion as a previously formed inner shoe or boot. According to my invention I use, as an innermost covering of the last, shaped pieces comprising e. g. an inner sole and a U-shaped upper and side lining consisting of lining material rubber-covered on its outer side and pre-vulcanized thereafter. These, or other suitable shaped pieces of rubber-covered and pre-vulcanized lining material, are so placed on the press last, that the lining pieces together surround the last in same way as it is surrounded by the lining shoe treated of in the said patent. The pre-vulcanized shaped pieces of rubber-covered lining material placed on the last may be afterwards covered with reinforcing pieces at various places e. g. at the heel, in a similar way to the reinforcement of the made-up shoe. In this way the production of the pre-vulcanized inner shoe treated of in the said patent is avoided, it being replaced by separate shaped pieces of pre-vulcanized lining material, which are assembled around the last in such a manner that the shaped pieces, by themselves or together with reinforcing rubber coatings, surround the last in the same manner as the previously produced lining shoe or boot hitherto employed. The employment of pre-vulcanized lining according to the invention enables the pressing up of rubber foot-wear to be carried out in a cheaper and more practical way than according to the said patent. Rubber-impregnated lining which has been pre-vulcanized before being used for rubber foot-wear is known, as such lining has heretofore been used at the hand-manufacture of galoshes built up layer after layer in such a way that the last is first covered with the lining and thereupon covered layer after layer with rubber-impregnated linen or rubber pieces rolled on to the pieces formerly placed and fixed. In hand-made rubber foot-wear pre-vulcanized lining has been used, if the foot-wear has to be afterwards vulcanized in a vulcanizing box, but the object hereof has been only to avoid injury or deformation of the lining in the clamping up of the foot-wear between the mould portion of the vulcanizing box. Contrary to the hand-making of foot-wear the present invention is intended to enable the mechanical pressing up of rubber foot-wear to be carried out in a simpler manner than by employment of the formerly used pre-vulcanized made-up lining shoe or boot, and practice has proved that mechanical pressing up of foot-wear may be carried out in a perfectly satisfactory way without the pre-vulcanized inner shoe, if instead of this a corresponding lining is built up on the last, consisting of pre-vulcanized shaped pieces, which may be reinforced outwardly after being placed on the last by applying suitable rubber reinforcements thereto e. g. at the heel. The lining built up in this way on the last acts in exactly the same way as the pre-vulcanized lining shoe placed on the last according to the said patent, the lining having owing to the pre-vulcanization the necessary stiffness to prevent displacement or folding while at the same time the lining has become impermeable (also owing to the pre-vulcanization) to the outer rubber, which is liquid during the pressing up process.

I claim:

1. The herein described method of producing pressed rubber footwear containing a rubber sole and at least partially rubber-covered sides, said method comprising building up and composing a continuous lining portion, which is to form part of the finished footwear as its inner lining, on the said press last, the said building up being carried out from rubber-covered and thereafter pre-vulcanized lining material cut to form-pieces, such as lining sole and side lining, thereupon placing on the outer surface of the lining inner portion non-preformed pieces of unvulcanized rubber without proper mutual cohesion, and finally press casting the outer rubber pieces to the shape of correctly formed outer footwear.

2. A method as claimed in claim 1 characterized in that when the lining covering has been built up on the press last from form-pieces of rubber-covered and pre-vulcanized lining material, the said lining covering is reinforced by attaching a reinforcing piece of rubber-impregnated fabric about the heel portion of the lining covering.

3. The herein described method of producing pressed rubber footwear having a rubber sole and at least partially rubber-covered sides, which method consists in assembling a plurality of form pieces consisting of at least partially rubber-covered fabric, which after being covered with the rubber is subjected to a preliminary vulcanization, to a continuous inner lining on a press-last, applying roughly cut rubber to the outer face of the said lining, and applying a hot casting pressure to the assembly to form the resulting article.

4. The herein described method of producing pressed rubber footwear comprising the steps mentioned in claim 3 and the further step of attaching a reinforcement of rubber-impregnated fabric about the heel portion of the continuous inner lining built up on the last.

HENRY CHRISTIAN LOUIS DUNKER.